(12) United States Patent
Dayan et al.

(10) Patent No.: US 10,148,692 B2
(45) Date of Patent: *Dec. 4, 2018

(54) AGGREGATION OF ASYNCHRONOUS TRUST OUTCOMES IN A MOBILE DEVICE

(71) Applicant: Google LLC, Mountain View, CA (US)

(72) Inventors: Tal Dayan, Los Gatos, CA (US); Maya Ben Ari, Palo Alto, CA (US); Tanton Holt Gibbs, Redmond, WA (US); Ido Ofir, Los Altos, CA (US); Jay Pierre Civelli, Sunnyvale, CA (US); Brandon Keely, San Francisco, CA (US); Christiaan Prins, San Francisco, CA (US); Zheng Sun, Mountain View, CA (US); Ning Zheng, Mountain View, CA (US); James Brooks Miller, Sunnyvale, CA (US); Jennifer Fernquist, San Francisco, CA (US); Rongjing Xiang, Mountain View, CA (US); Hugh Brendan McMahan, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,376

(22) Filed: Jun. 23, 2014

(65) Prior Publication Data

US 2015/0373050 A1     Dec. 24, 2015

(51) Int. Cl.
*H04W 12/06* (2009.01)
*H04L 29/06* (2006.01)
*H04W 88/02* (2009.01)

(52) U.S. Cl.
CPC ............. *H04L 63/20* (2013.01); *H04W 12/06* (2013.01); *H04W 88/02* (2013.01)

(58) Field of Classification Search
CPC . H04L 63/1408; H04L 63/1441; H04L 63/08; H04L 63/102; H04L 63/10;
(Continued)

(56) References Cited

U.S. PATENT DOCUMENTS

| 8,387,141 B1 | 2/2013 | Zhukov et al. |
| 8,412,158 B2 | 4/2013 | Forutanpour et al. |

(Continued)

FOREIGN PATENT DOCUMENTS

| EP | 2375799 A1 | 10/2011 |
| EP | 2662797 A1 | 11/2013 |

(Continued)

OTHER PUBLICATIONS

Riva, Oriana et al.,"Progressive authentication: deciding when to authenticate on mobile phones", Security'12 Proceedings of the 21st USENIX conference on Security symposium, Aug. 8, 2012, SENIX Association Berkeley, CA, USA.

(Continued)

*Primary Examiner* — Minh Dinh
(74) *Attorney, Agent, or Firm* — McDonnell Boehnen Hulbert & Berghoff LLP

(57) ABSTRACT

Systems and techniques are provided for aggregation of asynchronous trust outcomes in a mobile device. Trust levels may be determined from the signals. Each trust level may be determined independently of any other trust level. Each trust level may be determined based on applying to the signals heuristics, mathematical optimization, decisions trees, machine learning systems, or artificial intelligence systems. An aggregated trust outcome may be determined by aggregating the trust levels. Aggregating the trust levels may include applying heuristics, mathematical optimization, decisions trees, machine learning systems, or artificial intelligence systems to the trust levels, and wherein the aggre- (Continued)

gated trust outcome; and sending the aggregated trust outcome to be implemented by the enabling, disabling, or relaxing of at least one security measure based on the aggregated trust outcome.

23 Claims, 4 Drawing Sheets

(58) Field of Classification Search
CPC ......... H04L 63/0853; H04L 2463/082; H04W 12/12; H04W 12/06; H04W 12/08; G06F 21/31; G06F 21/34; G06F 21/40; G06F 2221/2113; G06N 99/005
USPC .......................................................... 726/3
See application file for complete search history.

(56) References Cited

U.S. PATENT DOCUMENTS

| | | | |
|---|---|---|---|
| 8,713,704 B2 | 4/2014 | Davis et al. | |
| 9,633,184 B2* | 4/2017 | Ben Ari | G06F 21/31 |
| 2006/0074986 A1 | 4/2006 | Mallalieu et al. | |
| 2007/0150745 A1 | 6/2007 | Peirce et al. | |
| 2008/0101658 A1 | 5/2008 | Ahern et al. | |
| 2011/0016534 A1* | 1/2011 | Jakobsson | G06F 21/316 726/28 |
| 2012/0007713 A1 | 1/2012 | Nasiri et al. | |
| 2013/0055348 A1* | 2/2013 | Strauss | G06F 21/31 726/3 |
| 2013/0061305 A1 | 3/2013 | Bruso et al. | |
| 2013/0067566 A1 | 3/2013 | Oh | |
| 2013/0227678 A1 | 8/2013 | Kang et al. | |
| 2014/0010417 A1 | 1/2014 | Hwang et al. | |
| 2014/0033326 A1* | 1/2014 | Chien | H04W 12/08 726/28 |
| 2014/0096231 A1 | 4/2014 | Smith et al. | |
| 2014/0289820 A1* | 9/2014 | Lindemann et al. | 726/5 |
| 2014/0289833 A1* | 9/2014 | Briceno | H04L 63/08 726/7 |
| 2014/0380424 A1 | 12/2014 | Thompson | |

FOREIGN PATENT DOCUMENTS

| | | |
|---|---|---|
| WO | 2009026337 A1 | 2/2009 |
| WO | 2011057287 A1 | 5/2011 |
| WO | 2013131265 A1 | 9/2013 |

OTHER PUBLICATIONS

Shi, Elaine et al., Implicit Authentication through Learning User Behavior, ISC'10 Proceedings of the 13th international conference on Information security, Oct. 25, 2010, Springer-Verlag Berlin, Heidelberg.

International Search Report and Written Opinion issued in PCT/US2015/032454 dated Aug. 20, 2015.

Shi, et al., "Implicit Authentication through Learning User Behavior", ISC'10 Proceedings of the 13th international conference on Information security, Oct. 25, 2010, Springer-Verlag Berlin, Heidelberg.

Riva et al. "Progressive authentication: deciding when to authenticate on mobile phones", Proceedings of the 21st USENIX conference, Aug. 8, 2012, SENIX Association Berkeley, CA.

* cited by examiner

AGGREGATION OF ASYNCHRONOUS TRUST OUTCOMES IN A MOBILE DEVICE

BACKGROUND

Mobile computing devices, such as smartphones and tablets, may require users to authenticate themselves to the device before allowing the user to perform various actions. For example, a smartphone lock screen may require the user to enter a PIN to unlock the smartphone, and may also require the user to enter passwords at various other points during usage of the smartphone. This may result in frequent interruption of the user's use of the mobile computing device, as the user has to stop whatever action they were attempting to authenticate themselves to the device. The user may also set security preferences so that the mobile computing device doesn't present certain prompts for authorization. For example, a smartphone's user may set preferences that prevent the smartphone from requesting a PIN to unlock the smartphone. This may streamline the user's experience, as the user may see fewer interruptions, but may make the mobile computing device less secure, as any other user could unlock and use the smartphone.

Certain signals from the mobile computing device may be used to more intelligently present authentication prompts to the user. For example, a PIN may be required to unlock a smartphone during certain times of day, but not during others. Various components of mobile computing devices operating system or platform may be able to make security decisions, however, the components may make separate decisions and may not always agree with each other, creating situations where some components may indicate the authentication prompts can be skipped while other components indicate that authentication prompts should continue to be presented to the user.

BRIEF SUMMARY

According to an embodiment of the disclosed subject matter, signals may be received from sensors. Trust levels may be determined from the signals. Each trust level may be determined independently of any other trust level. Each trust level may be determined based on applying to the signals heuristics, mathematical optimization, decisions trees, machine learning systems, or artificial intelligence systems. An aggregated trust outcome may be determined by aggregating the trust levels. Aggregating the trust levels may include applying heuristics, mathematical optimization, decisions trees, machine learning systems, or artificial intelligence systems to the trust levels, and wherein the aggregated trust outcome; and sending the aggregated trust outcome to be implemented by the enabling, disabling, or relaxing of at least one security measure based on the aggregated trust outcome.

Determining one of the trust levels may include applying data from a state. The data may be a historical trust level or a historical value for a signal used to determine the trust level. Determining the aggregated trust outcome may include applying at least one configuration setting. Determining the aggregated trust outcome may include applying data from a state. The data may include a historical trust level or a historical aggregated trust outcome.

The aggregated trust outcome may be either a global aggregated trust outcome or a granular aggregated trust outcome. A granular aggregated trust outcome may be implemented by the enabling, disabling, or relaxing of security measures associated with the granular aggregated trust outcome and cannot affect security measures not associated with the granular aggregated trust outcome. The aggregated trust outcome may indicate a confidence level based on aggregating trust levels that a user of a mobile computing device is an authorized user of the mobile computing device. A trust level may indicate a confidence level based on analyzing received signals that a user of a mobile computing device is an authorized user of the mobile computing device. The security measure may be a request for credentials to unlock a mobile computing device.

According to an embodiment of the disclosed subject matter, a means for receiving signals from sensors, a means for determining trust levels from the signals, where each trust level is determined independently of any other trust level, and where each trust level is determined based on applying to signals heuristics, mathematical optimization, decisions trees, machine learning systems, or artificial intelligence systems, a means for determining an aggregated trust outcome by aggregating the trust levels, wherein aggregating the trust levels includes a means for applying heuristics, mathematical optimization, decisions trees, machine learning systems, or artificial intelligence systems to the trust levels, a means for sending the aggregated trust outcome to be implemented by the enabling, disabling, or relaxing of at least one security measure based on the aggregated trust outcome, a means for determining a trust level further including a means for applying data from a state where the data may include a historical trust level or a historical value for a signal used to determine the trust levels, a means for determining the aggregated trust outcome further including a means for applying a configuration setting, and a means for determining the aggregated trust outcome further including a means for applying data from a state, where the data may include a historical trust level or a historical aggregated trust outcome, are included.

Systems and techniques disclosed herein may allow for aggregation of asynchronous trust outcomes in a mobile device. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
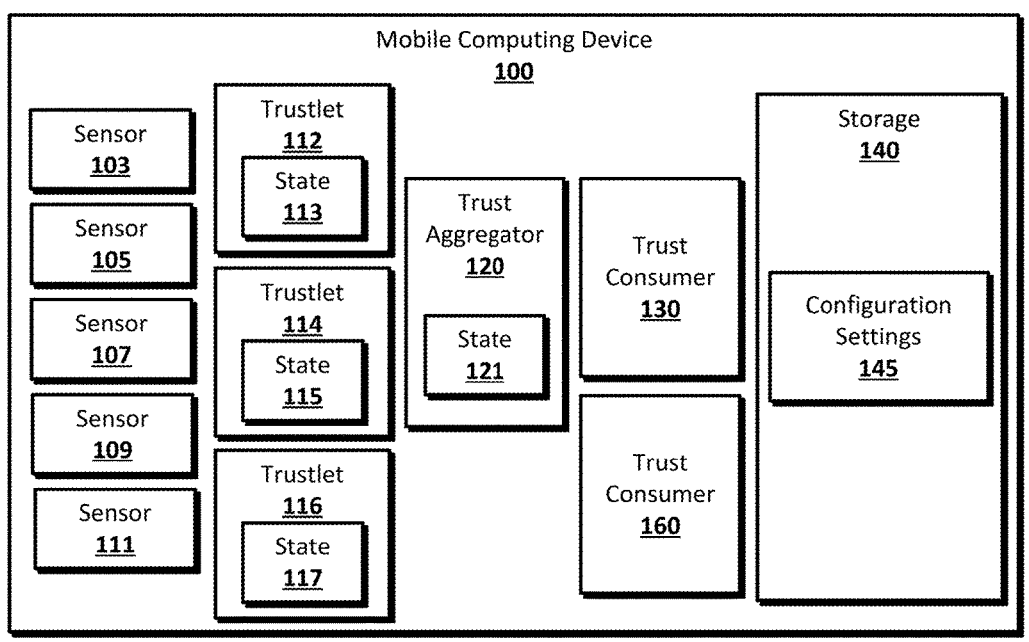
FIG. 1 shows an example system suitable for aggregation of asynchronous trust outcomes in a mobile device according to an implementation of the disclosed subject matter.

Aggregation of asynchronous trust outcomes on mobile device may be used on a mobile computing device to allow for security decisions for the mobile computing device to be made based on an aggregation of trust levels determined based on signals from sensors of the computing device. Trustlets may receive signals from various sensors on a computing device. Different trustlets may receive signals from different sensors or groups of sensors. Each trustlet may analyze the received signals to determine a trust level for the mobile computing device, which may correspond to the trustlets' level of confidence that the mobile computing device is being used by an authorized user of the mobile computing device or is in an otherwise secure environment in which security measures can be relaxed or disabled. The trustlets may determine trust levels based on stored state information, which may be individual to each trustlet, or shared among different trustlets. The trustlets may output their trust levels, which may be aggregated and analyzed based on a state of the aggregator and configuration settings set by a user of the mobile computing device. The trust levels may be aggregated into an aggregated trust outcome, which may be output to component of the mobile computing device to govern their behavior. For example, the aggregated trust outcome may directly govern security decisions on the mobile computing device, resulting in the enabling or disabling of security measures, or may be combined with other trust outcomes to govern the security state of the mobile computing device.

A mobile computing device may have various sensors for generating and receiving various kinds of data which may be used as signals by trustlets. The sensors may be hardware sensors, such as, for example, cameras, microphones, accelerometers, gyroscopes, Global Positioning System (GPS) chips, Bluetooth chips, thermometers, touchscreens, hard keys, cellular and WiFi radios, moisture sensors, pressure sensors, and fingerprint scanners. The sensors may be based on the mobile computing device or upon other sensors remote from mobile device that can be stand-alone sensors or sensors that can be a part of other devices. The sensors may also be software based, for example, generating signals from data received through hardware. For example, signals regarding the location of other computing devices owned by the user of a computing device may be generated by software sensors that analyze data received from external sources, and signals regarding the identity of the current user of a computing device may be generated by analyzing data input by the current user, such as, for example, passwords, PINS, words and phrasing used in text input, and searches conducted by the current user. For example, a smartphone may include a camera, a microphone, a GPS chip, a touchscreen, and an accelerometer. Images from the camera, sounds picked up by the microphone, the location and movement of the smartphone according to the GPS chip, the angle and positioning of the smartphone detected by the accelerometer, and the size of the current user's fingers may all be signals used by a trustlet in determining a current trust level.

Trustlets, implemented by any suitable combination of hardware and software on a mobile computing device, may receive signals from the sensors of the mobile computing device. The trustlets may be, for example, components of an operating system or platform, separately installed applications, or the constituent components of an application or operating system component. The trustlets may receive copies of the signals from the sensors, as the signals may also be used in the operation of the mobile computing device. For example, a speech segment picked up by the microphone may be part of a phone call. A trustlet may receive a copy of the audio without preventing the audio from being sent out as part of the phone call. Signals may be received from sensors continuously, at predefined or intervals, or based on the occurrence of events, and may be transmitted as, for example, a function call, event broadcast, data in shared memory, or serial communication. Different sensors may send signals may send signals at different schedules, using different protocols.

The trustlets may use the signals to determine a trust level. The trust level determined by a trustlet may indicate a degree of confidence the trustlet has that the mobile computing device is being used by an authorized user, for example, the owner of the mobile computing device, or is in a situation where no unauthorized user has access to the mobile computing device. Different trustlets may receive signals from different sensors and may perform different types of analysis to determine a trust level. For example, a trustlet may use signals from an accelerometer, GPS radio, microphone, and camera to detect whether the mobile computing device has been subject to a mishap, and may determine the trust level the trustlet has in the security of the mobile computing device based on whether a mishap is detected, and the nature of the mishap. For example, the trustlet may be able to determine if a smartphone has been dropped on the ground, or a bag containing the smartphone has been stolen. A trustlet may only use signals from the microphone to determine who is using, and near, the mobile computing device based on voice printing and recognition. A trustlet may use signals from the GPS radio, WiFi radio, cellular radio, clock, and calendar to determine the current location of the mobile computing device and compare it to normal locations for the mobile computing device given the time of day, day of week, and day of year. For example, the trustlet may determine a smartphone is in the smartphone owner's house at a time when the smartphone is normally in the house, and may have a high trust level. The same trustlet may determine that the smartphone is at the owner's office at a time when it is normally at the owner's house, and may have a low trust level, as the owner may have accidentally left the smartphone in the office. A trustlet may use signals from the accelerometer, GPS radio, WiFi radio, and cellular radio to analyze the movements of the mobile computing device, determining, for example, that the smartphone is with a person who is walking with the gait of the owner of the smartphone. A trustlet may use signals from the WiFi radio, Bluetooth radio, and data received through, for example, cloud services, to detect other devices, such as smartphone, tablets, laptops, TV's, and Bluetooth enabled devices, that are in the vicinity of the mobile computing device. For example, the trustlet may have a high trust level when a smartphone is near other device's known to be owned by the owner of the smartphone, such as a Bluetooth headset used often with the smartphone or a laptop known to be owned by the owner of the smartphone that is connected to the same WiFi network as the smartphone.

Trustlets may analyze the received signals in any suitable manner. For example, trustlets may use, in any suitable combination, rules, heuristics decision trees, mathematical optimization, or any suitable machine learning system such as a neural network, genetic algorithm, or other artificial intelligence algorithm. A trustlet may be able to track a state, which may include, for example, a recent history of signals processed and analyzed by the trustlet, recent trust levels determined by the trustlet, and facts and coefficients learned by the trustlet using, for example, a machine learning system. Trustlets may have their own individual states, and may also share state when appropriate. A trustlet may use any available state in combination with signals received from the sensors to determine a trust level. For example, a trustlet may be able to observe changes in a particular signals based on comparing the most recent signals from a sensor to previously received signals from the sensor stored in the trustlet's state.

Trust levels may be output from the trustlets continuously, at predefined intervals, or based on events. The trust levels may be aggregated and analyzed to determine an aggregated trust outcome for the mobile computing device in any suitable manner. For example, the received trust levels may be analyzed using, in any suitable combination, rules, heuristics decision trees, mathematical optimization, or any suitable machine learning system such as a neural network, genetic algorithm, or other artificial intelligence algorithm. The aggregated trust outcome may also be based on a state, for example, of a trust aggregator responsible for determining the aggregated trust outcome, as well configuration setting, which may be set by a user. The state may include recently determined aggregated trust outcomes and historical usage patterns for the mobile computing device. Aggregated trust outcomes may be determined on a continual basis, at predefined intervals, or on the occurrence of certain events.

The trust levels may be aggregated into a single aggregated trust outcome for the mobile computing device, for example, determining whether security measures on the mobile computing device can be relaxed or disabled on a global basis, or into multiple aggregated trust outcomes which may be used to control specific security measures. For example, a global aggregated trust outcome may indicate whether a current user of the mobile computing device is an authorized user of the mobile computing device. Granular aggregated trust outcomes may indicate whether the user of the mobile computing device is authorized to perform specific actions. For example, one granular aggregated trust outcome may determine whether the current user can perform a financial transaction using a banking application, while a different granular aggregated trust outcome may determine whether the current user can read the SMS massages stored on the mobile computing device.

Various components of the mobile computing device, including, for example, components of the operating system and platform of the mobile computing device and applications on the mobile computing device, may use global or granular aggregated trust outcomes to enable, disable, or relax security measures. For example, a global aggregated trust outcome that indicates that the current user of a smartphone is the owner of the smartphone may result in the disabling of lock screen security measures. The smartphone may not lock, and may not request credentials, such as a password or PIN, from the user when awakened from sleep or after the display has timed out and turned off. A change in the global aggregated trust outcome, from indicating an authorized user to indicating an unauthorized user or uncertainty about the user, may result in re-enablement of previously disabled or relaxed security measures. For example, the smartphone's lock screen may be re-enabled, resulting in a request for credentials from the user to unlock the smartphone. A global aggregated trust outcome that was aggregated from very low trust levels from the trustlets may result in the mobile computing device being wiped, for example, erasing its own storage, or being rendered non-functional, as very low level trust levels may indicate a mobile computing device that has been stolen or otherwise in the possession of unauthorized users for a long period of time.

FIG. 1 shows an example system suitable for aggregation of asynchronous trust outcomes in a mobile device. according to an implementation of the disclosed subject matter. A mobile computing device 100 may include sensors 103, 105, 107, 109, and 111, trustlets 112, 114 and 116, a trust aggregator 120, trust consumers 130 and 160, and storage 140. The mobile computing device 100 may be any suitable device, such as, for example, a computer 20 as described in FIG. 4, having sensors 103, 105, 107, 109, and 111, for implementing the trustlets 112, 114, and 116, trust aggregator 120, trust consumers 130 and 160, and storage 140. The mobile computing device 100 may be a single computing device, or may include multiple connected computing devices, and may be, for example, a mobile computing device, such as a tablet or smartphone, running a mobile operating system that may be part of a mobile platform. The trustlets 112, 114, and 116 may use signals from the sensors 103, 105, 107, 109 and 111 to determine trust levels, which may indicate the confidence of a trustlet in the security of the mobile computing device 100. The trust aggregator 130 may aggregate trust levels from the trustlets 112, 114, and 116 to determine aggregated trust outcomes for the mobile computing device 100. The storage 140 may store configuration setting, and states 113, 115, 117, and 121 when they are not in use by the trustlets 112, 114, and 116 and the trust aggregator 120. The components of the mobile computing device 100 may also be implemented wholly or partially remotely, for example, using cloud computing and cloud storage. For example, the trust aggregator 120 may be implemented on the mobile computing device 100, but may use processing time on a remote server as well.

The sensors 103, 105, 107, 109, and 111 may be any suitable hardware and software sensors for generating signals regarding the state of the computing device 100. The sensors 103, 105, 107, and 109 may be, for example, hardware sensors, such as a GPS chip, a WiFi radio, a cellular radio, a camera, a microphone, a touchscreen, an accelerometer, a pressure sensor, a moisture sensor, and a fingerprint scanner. The sensors 103, 105, 107, and 109, may also be, for example, software sensors, such as a system clock, an input detector, or any component of the computing device 100, such as the operating system, capable of receiving external data relevant to the current state of the computing device 100, such as the entry of passwords or PINS associated with accounts used with the computing device 100. The sensors 103, 105, 107, 109 and 111 may generate signals that may be used by the trustlets 112, 114, and 116.

The trustlets 112, 114, and 116 may be any suitable combination of hardware and software implemented on the mobile computing device 100 for analyzing signals from the sensors 103, 105, 107 109, and 111 and determining a trust level. For example, the trustlets 112, 114, and 116 may be applications or other such components installed on the mobile computing device 100 independently from the operating system used by the mobile computing device 100, or may be components of the operating system. A user may, for example, download and install the trustlets 112, 114, and 116, from a storefront for an application ecosystem associated with the same platform as the operating system on the computing device 100. The trustlets 112, 114, and 116 may be installed separately, or may be installed together with the trust aggregator 120 as a single component or application. The trustlets 112, 114, and 116 may be capable of receiving signals from any of the sensors 103, 105, 107, 109, and 111 on the mobile computing device 100. The signals may be, for example, raw signal data, such as raw audio data from a microphone, or may be processed by software by software or hardware associated with the signals, for example, using encoding software associated with a camera, to produce processed signal data. The trustlets 112, 114, and 116 may use any suitable analysis, including heuristic, optimization, decision-tree, and machine learning system analysis, to determine a trust level from the trust signals. The trustlets 112, 114, and 116 may continuously determine and output trust levels, or may do so at predefined intervals or based on the occurrence of certain events.

The trustlets 112, 114, and 116 may have states 113, 115, and 117. The state 113, 115, and 117 may include data used by the trustlets in determining the trust level. For example, the state 113 may include data indicating previous trust levels determined by the trustlet 112 and previous signals received by the trustlet 112. The trustlet 112 may use the data in the state 113 when determining a trust level from received signals from any of the sensors 103, 105, 107, 109, and 111. The states 113, 115, and 117 may be stored in the storage 140, and may be held in, for example, volatile memory for access by the trustlets 112, 114, and 116 when the trustlets are operating on the mobile computing device 100.

The trust aggregator 120 may be any suitable combination of hardware and software on the mobile computing device 100 for receiving trust levels from trustlets, such as the trustlets 112, 114, and 116, and determining an aggregated trust outcome for the mobile computing device 100 based on the trust levels. For example, the trust aggregator 120 may be a component of the operating system used by the mobile computing device 100, or may be a separately installed application which may use an API to interface with the operating system to manage the security measures used by the mobile computing device 100. The trust aggregator 120 may be associated with the trustlets 112, 114, and 116, which may be installed as part of the same component or application as the trust aggregator 120. The mobile computing device 100 may include more than one trust aggregator, and each trust aggregator may have its own associated trustlets.

The trust aggregator 120 may determine an aggregated trust outcome for the mobile computing device 100 based on the trust levels received from the trustlets 112, 114, and 116. For example, the trust aggregator 120 may use, in any suitable combination, rules, heuristics decision trees, mathematical optimization, or any suitable machine learning system such as a neural network, genetic algorithm, or other artificial intelligence algorithm, to aggregate the trust levels from the trustlets 112, 114, and 116 into an aggregated trust outcome. The trust aggregator 120 may also use the state 121, which may include recently determined aggregated trust outcomes and historical usage patterns for the mobile computing device. Aggregated trust outcomes may be determined on a continual basis, at predefined intervals, or on the occurrence of certain events, and may be global or granular. For example, the trust aggregator 120 may favor trust levels from certain trustlets over trust levels from other trustlets, due to, for example, patterns acquired using a machine learning system. For example, a high trust level from a trustlet that uses voice recognition to detect the presence of an authorized user may override a low trust level from a trustlet that determines the location of the mobile computing device 100 in the determination of the aggregated trust outcome.

The configuration settings 145 may include any suitable user security preferences, which may be input using, for example a user interface on the mobile computing device 100. The configuration settings 145 may be used by the trust aggregator 120 when determining aggregated trust outcomes. For example, the configuration settings 145 may specify that the trust aggregator 120 should weigh trust levels from certain trustlets, for example, the trustlet 112, over trust levels from other trustlets, for example, the trustlet 114. The configuration settings 145 may also be used to indicate to the trust aggregator 120 situations in which the user, for example, the owner of the mobile computing device 100, believes the aggregated trust level should vary from what the trust aggregator 120 may determine when aggregated the trust levels from the trustlets 112, 114 and 116.

The trust consumers 130 and 160 may be any suitable combination of hardware and software on the computing device 100 for components or applications that may use aggregated trust outcomes for any suitable purpose. For example, the trust consumer 130 may be a part of the operating system or platform used by the computing device 100 that may gather aggregated trust outcomes from the trust aggregator 120 and any other trust aggregators on the mobile computing device 100, and may use the aggregated trust outcomes to managed the security state of the mobile computing device 100. For example, the trust consumer 130 may determine a global security state for the mobile computing device 100, which may govern whether certain security measures, such as lock screen password requirements, are enabled, disabled, or relaxed. The trust consumer 160 may be, for example, an application or component of the mobile computing device 100 that may make direct use of the aggregated trust outcome. For example, the trust consumer 160 may be a banking application which may use the aggregated trust outcome to determine whether a current user of the mobile computing device 100 should be required to enter credentials before performing actions, such as executing a financial transaction, with the application. The trust consumer 160 may be, for example, a component of the operating system of the mobile computing device 100, which may be a smartphone in a sleep state, with the display off. A hardware button on the smartphone may wake the smartphone and turn the display on. When the hardware button is pressed, the trust consumer 160 may govern whether the smartphone will be in a locked state after waking up and require the user to authenticate themselves to resume using the smartphone, or whether the smartphone will awaken into an unlocked state. If the trust consumer 160 has received an aggregated trust outcome indicating a high trust level form the trust aggregator 120, the trust consumer 160 may cause the smartphone to awaken into an unlocked state. The trust consumers 130 and 160 may enable, disable, and relax various security measures on the mobile computing device 100 in accordance with global or granular aggregated trust outcomes received from the trust aggregator 120.

Figure 2:
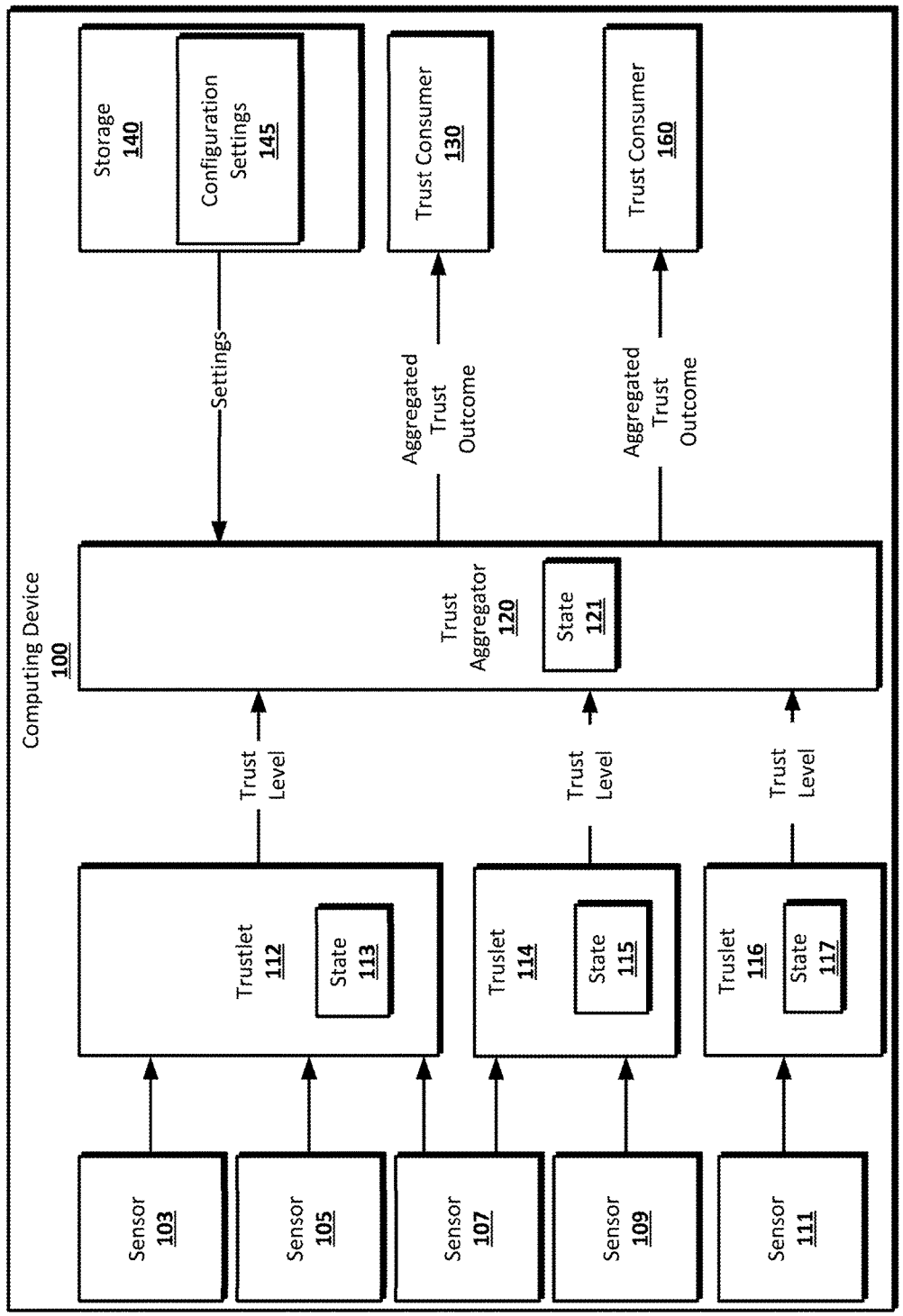
FIG. 2 shows an example arrangement for aggregation of asynchronous trust outcomes in a mobile device according to an implementation of the disclosed subject matter.

FIG. 2 shows an example arrangement for aggregation of asynchronous trust outcomes in a mobile device according to an implementation of the disclosed subject matter. The sensors 103, 105, 107, 109, and 111 may generate continuously or discretely, for example, depending on the nature of the signal, the state of the mobile computing device 100, and considerations such as battery life of the mobile computing device 100. For example, a microphone may continuously generate audio signals based on any picked up audio, while a camera may only be used to generate images for facial recognition when the mobile computing device 100 is in an environment where such images may be useful, and not, for example, when the mobile computing device 100 is located in a person's pocket.

The trustlets 112, 114, and 116 may receive signals from the sensors 103, 105, 107, 109, and 111. For example, the trustlet 112 may receive signals from the sensors 103, 105, and 107, the trustlet 114 may receive signals from the sensors 107 and 109, and the trustlet 116 may receive signals from the sensor 111. The trustlets 112, 114, and 116 may analyze the received signals to determine a trust level for the mobile computing device 100. Each of the trustlets 112, 114, and 116 may make its own trust level determination, separate from the other trustlets, and based only on the signals received by the trustlet. For example, the trustlet 114 may determine a trust level based on signals from the sensors 107 and 109, while the trustlet 116 may determine a trust level based on the signal from the sensor 111.

The trustlets 112, 114, and 116 may use, for example, heuristics, optimization, decision-trees, or any suitable machine learning or artificial intelligence system to determine their trust levels, and different trustlets may use different techniques. For example, the trustlet 112 may apply a neural network to the signals from the sensors 103, 105, and 107, while the trustlet 114 may use a decision tree to determine a trust level from the signals from the sensors 107 and 09. The trustlets 112, 114, and 116 may use the states 113, 115, and 117, as appropriate, in determining a trust level. The trust level may be, for example, a binary determination of trusted or not trusted, or may be a probability or confidence level, for example, between 0% and 100%, indicating how confident the trustlet is that the current user of the mobile computing device 100 is an authorized user of the mobile computing device 100, or that the mobile computing device 100 is in an otherwise secure environment. The trust levels may be determined and output by the trustlets 112, 114, and 116 continuously, at predefined intervals, or based on the occurrence of events.

The trust aggregator 120 may receive the trust levels from the trustlets 112, 114, and 116. The trust aggregator 120 may aggregate the trust levels received from the trustlets 112, 114 and 116 in any suitable manner to determine global and granular aggregated trust outcomes. For example, the trust aggregator 120 may apply any suitable combination of heuristics, mathematical optimization, decisions trees, or any suitable machine learning or artificial intelligence system to the received trust levels to determine the aggregated trust outcome. The aggregated trust outcome may be binary, for example, either trusted or not trusted, or may be a confidence level or probability, for example, between 0% and 100%. The aggregated trust outcome may be determined continuously, at predetermine intervals, or on the occurrence of events, such as, for example, the receipt of an updated trust level from one of the trustlets 112, 114, and 116. The trust aggregator 120 may also use the state 121, and the configuration settings 145, when determining the aggregated trust outcome.

The aggregated trust outcome may reflect an intelligent aggregation of the trust levels received from the trustlets 112, 114, and 116. For example, the trustlet 112 may receive signals from a GPS radio, WiFi radio, and cellular radio, and may determine that the mobile computing device 100 is located in the home of the owner of the mobile computing device 100 at a time when the owner is normally home. This may result in a very high trust level from the trustlet 112. The trustlet 116 may receive signals from a microphone, and may determine using voice recognition that the mobile computing device 100 is currently being used by a person who is now the owner or an authorized user. The aggregated trust outcome from the trust aggregator 120 may reflect that although the mobile computing device 100 is in a normally secure environment, an unauthorized user may currently be in possession of the mobile computing device 100, resulting in more security measures being enabled than would otherwise be if only the trust level from the trustlet 112 was taken into consideration.

The trust consumers 130 and 160 may be run on the mobile computing device 100. The trust consumer 130 may be, for example, a component of the operating system or platform used by the mobile computing device 100, such as the lock-screen process, or a component that may gather aggregated trust outcomes from a number of different trust aggregators on the mobile computing device 100. The trust consumers 160 may be an application, such as a banking application. The trust consumers 130 and 160 may receive the aggregated trust outcome from the trust aggregator 120 continuously, at predefined intervals, or on the occurrence of an event, such as an attempted action that may invoke a security measure. For example, the trust consumer 130, which may be a lock-screen process, may detect an attempt to unlock the mobile computing device 100. The trust consumer 130 may receive the aggregated trust outcome, which may be global, or may be granular and specific to the trust consumer 130 or to the action of unlocking the mobile computing device 100, and may either request or not request credentials to unlock the mobile computing device 100 based on the aggregated trust outcome. For example, if the aggregated trust outcome is a confidence level, the trust consumer 130 may require credentials to unlock the mobile computing device 100 unless the aggregated trust outcome is 90% or higher. An aggregate trust threshold may be set and associated with one or more permissions or authorizations. If the threshold is met, then the permission or authorization may be granted. If the threshold is not met, the permission or authorization may not be granted. For example, an aggregate trust threshold of 65% may be set to grant access to play a song requested by a user. If the threshold is met, the song may be played, and if not, the user's request to play the song may be denied. An aggregate trust threshold of 85% may be set for a user to share the same song with another user. Such thresholds may vary based on the requesting user. For example, the threshold may be changed based on a history of actions associated with a user, such as a number of songs already shared or played by the user.

The techniques disclosed herein may be applied using machine-learned models generated using supervised learning data such as labeled examples. The labeled examples may be input into a machine learning system and the output from the machine learning system may be a machine-learned model that contains weights that are generated in response to the labeled data. The labeled examples may contain both an outcome and properties associated with a specific instance. It will be understood that the weights and outcomes may be unitless numerical values, percentages, counts of occurrences, or other quantification. A machine learning system may receive labeled data (e.g., labeled examples) to develop a machine-learned model that contains weights that are generated in response to the supervised labeled data. One or more rules may be created by a machine-learned model.

Figure 3:
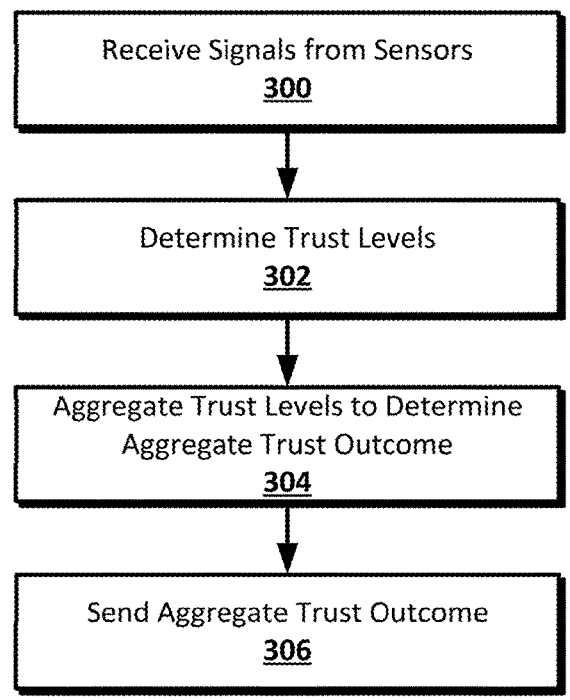
FIG. 3 shows an example of a process for aggregation of asynchronous trust outcomes in a mobile device according to an implementation of the disclosed subject matter.

FIG. 3 shows an example of a process for aggregation of asynchronous trust outcomes in a mobile device according to an implementation of the disclosed subject matter. At 300, signals may be received from sensors. For example, the trustlets 112, 114, and 116 may each receive signals from any combination of the sensors 103, 105, 107, 109, and 111. The signals may be received on a continuous or discrete basis, at predetermined intervals or based on the occurrence of an event. The signals may be raw, for raw audio from a microphone, or may be processed by any suitable software or hardware associated with the sensor that generated the signal.

At 302, trust levels may be determined from the signals. For example, each of the trustlets 112, 114, and 116, may determine its own trust level based on the signals received by the individual trustlet. The trustlets 112 may, for example, by a mishap trustlet, and may determine a trust level based on a determination of whether or not a mishap has occurred with the mobile computing device 100. The signals may be analyzed by the trustlets 112, 114, and 116 in any suitable manner, for example, using heuristics, mathematical optimization, decision trees, or any suitable machine learning or artificial intelligence system. Different trustlets may use different forms of analysis. The trustlets 112, 114, and 116 may also use the states 113, 115, and 117 in analyzing the signals. The trust levels may be binary, or may be probability or confidence levels, for example, indicating a trustlets confidence that the mobile computing device 100 is being used by an authorized user or is in an otherwise secure environment.

At 304, the trust levels may be aggregated to determine an aggregated trust outcome. For example, the trust aggregator 120 may receive the trust levels determined by the trustlets 112, 114, and 116, and may determine an aggregated trust outcome, which may be global or granular. The trust aggregator 120 may aggregate the trust levels in any suitable manner, for example, using heuristics, mathematical optimization, decisions trees, or any suitable machine learning or artificial intelligence system. The trust aggregator 120 may determine the aggregated trust outcome on a continuous basis, at predetermined intervals, or on the occurrence of events, and may not need trust levels, or current trust levels, from all of the trustlets 112, 114, and 116. For example, the trust aggregator 120 may determine an aggregated trust outcome after receiving trust levels from only the trustlets 112 and 116, or after receiving new trust levels from the trustlets 112 and 114 while having an older trust level from the trustlet 116, stored, for example, in the state 121. The aggregated trust outcome may be global, for example, applying to all security measures on the mobile computing device 100, or granular, applying only to security measures for certain applications or components of the mobile computing device 100. The trust aggregator 120 may also use the state 121, and the configuration settings 145, when determining the aggregated trust outcome from the trust levels.

At 306, the aggregated trust outcome may be sent. For example, the aggregated trust outcome from the trust aggregator 120 may be sent trust consumers, such as the trust consumers 130 and 160, on the mobile computing device 100. The aggregated trust outcome may be sent continuously, at predetermined intervals, or on the occurrence of an event, such as a change in the aggregated trust outcome, a request for the aggregated trust outcome by a trust consumer, or the detection of an attempted action that may invoke a security measure of the mobile computing device 100. The trust consumers 130 and 160 may use the aggregated trust outcome, which may be global or granular, to determine when to enable, disable, and relax various security measures. For example, the trust consumer 130 may use the aggregated trust outcome to determine when to request credentials to unlock the mobile computing device 100.

Figure 4:
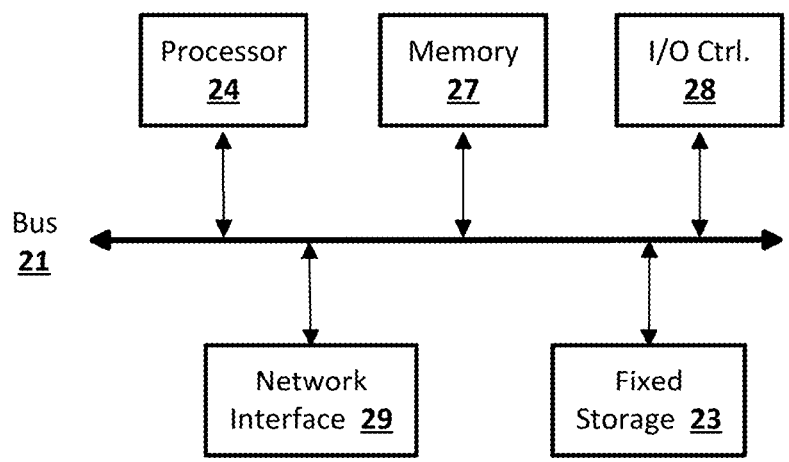
FIG. 4 shows a computer according to an embodiment of the disclosed subject matter.

Embodiments of the presently disclosed subject matter may be implemented in and used with a variety of component and network architectures. FIG. 4 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 5.

Many other devices or components (not shown) may be connected in a similar manner, such as document scanners, digital cameras, auxiliary, supplemental, or backup systems, or the like. Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 5:
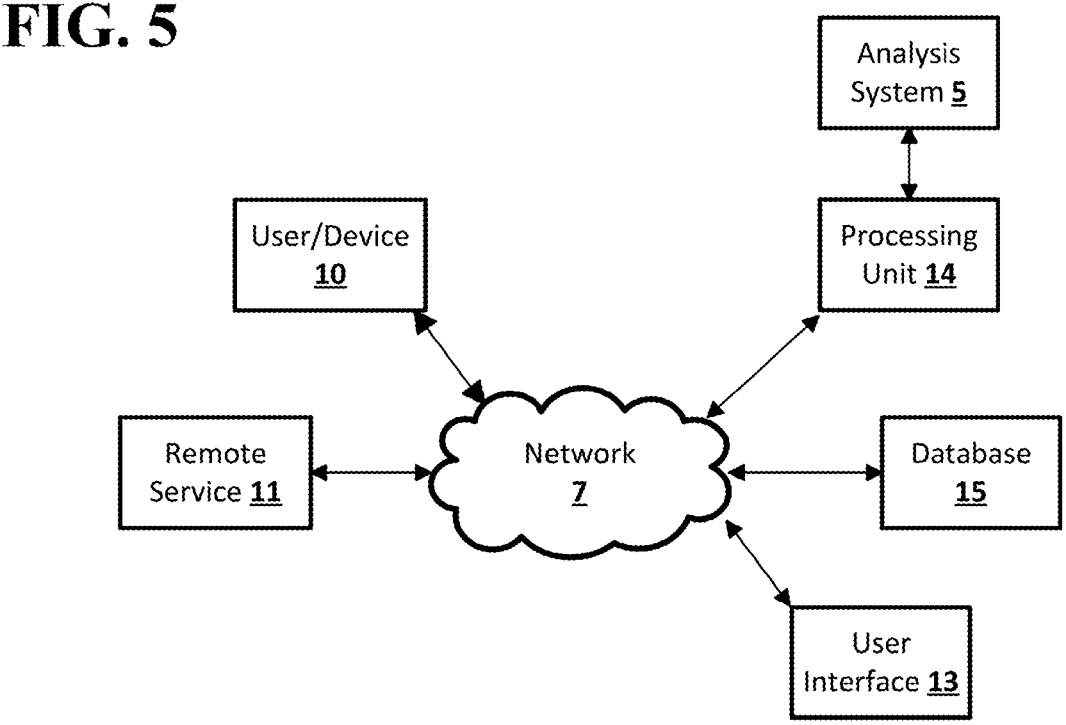
FIG. 5 shows a network configuration according to an embodiment of the disclosed subject matter.

FIG. 5 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
receiving one or more signals from one or more sensors, the one or more sensors comprising at least one hardware sensor;
determining at least two trust levels from the one or more signals, wherein a first trust level of the at least two trust levels is determined independent of a determination of a second trust level and without using the second trust level, and wherein the second trust level of the at least two trust levels is determined independent of the determination of the first trust level and without using the first trust level;
determining a first aggregated trust outcome by aggregating the at least two trust levels, wherein the first aggregated trust outcome is a granular aggregated trust outcome associated with a first security measure of a computing device;
determining a second aggregated trust outcome by aggregating the at least two trust levels, wherein the second aggregated trust outcome is a granular aggregated trust outcome associated with a second security measure different from the first security measure of the computing device;
wherein the first aggregated trust outcome is determined independent of the second aggregated trust outcome and without using the second aggregated trust outcome;
wherein the second aggregated trust outcome is determined independent of the first aggregated trust outcome and without using the first aggregated trust outcome;
enabling or disabling the first security measure based on the first granular aggregated trust outcome, wherein the first security measure is not associated with the second granular aggregated trust outcome and the second granular aggregated trust outcome is not used to enable or disable the first security measure; and
enabling or disabling the second security measure based on the second granular aggregated trust outcome, wherein the second security measure is not associated with the first granular aggregated trust outcome and the first granular aggregated trust outcome is not used to enable or disable the second security measure.

2. The computer-implemented method of claim 1, wherein determining one of the at least two trust levels further comprises applying data from at least one state wherein the data comprises one or more of a historical trust level and a historical value for one of the one or more signals used to determine the one of the at least two trust levels.

3. The computer-implemented method of claim 1, wherein determining the first aggregated trust outcome further comprises applying at least one configuration setting.

4. The computer-implemented method of claim 1, wherein determining the first aggregated trust outcome further comprises applying data from a state, wherein the data comprises one or more of a historical trust level and a historical aggregated trust outcome.

5. The computer-implemented method of claim 1, wherein the first aggregated trust outcome indicates a confidence level based on aggregating trust levels that a user of a mobile computing device is an authorized user of the mobile computing device.

6. The computer-implemented method of claim 1, wherein one of the at least two trust levels indicates a confidence level based on analyzing received signals that a user of a mobile computing device is an authorized user of the mobile computing device.

7. The computer-implemented method of claim 1, wherein the security measure is a request for credentials to unlock a mobile computing device.

8. A computer-implemented method performed by a data processing apparatus, the method comprising:
receiving a plurality of signals from a plurality of sensors, wherein the plurality of sensors comprises hardware and software sensors of a computing device;
determining a plurality of trust levels from the plurality of signals, wherein each of the plurality of trust levels is determined based on one or more of the plurality of signals independently from the determination of any other trust level of the plurality of trust levels and without using any other trust level of the plurality of trust levels, and wherein the determination of at least one of the plurality of trust levels based on one or more of the plurality of signals uses a signal from a hardware sensor;

aggregating the plurality of trust levels to determine a first aggregated trust outcome, wherein the first aggregated trust outcome is a granular aggregated trust outcome associated with a first security measure of a computing device;

aggregating the plurality of trust levels to determine a second aggregated trust outcome, wherein the second aggregated trust outcome a granular aggregated trust outcome associated with a second security measure of the computing device;

wherein the first aggregated trust outcome is determined independent of the second aggregated trust outcome and without using the second aggregated trust outcome;

wherein the second aggregated trust outcome is determined independent of the first aggregated trust outcome and without using the first aggregated trust outcome;

enabling or disabling the first security measure based on the first granular aggregated trust outcome, wherein the first security measure is not associated with the second granular aggregated trust outcome and the second granular aggregated trust outcome is not used to enable or disable the first security measure; and enabling or disabling the second security measure based on the second granular aggregated trust outcome, wherein the second security measure is not associated with the first granular aggregated trust outcome and the first granular aggregated trust outcome is not used to enable or disable the second security measure.

9. The computer-implemented method of claim 8, wherein each of the plurality of trust levels is determined by a trustlet.

10. The computer-implemented method of claim 8, wherein the first aggregated trust outcome is determined by a trust aggregator.

11. The computer-implemented method of claim 8, wherein each of the plurality of trust levels is a confidence level that a mobile computing device is either being used by an authorized user or is in a secure environment.

12. The computer-implemented method of claim 8, wherein the first aggregated trust outcome is a confidence level that a mobile computing device is either being used by an authorized user or is in a secure environment.

13. The computer-implemented method of claim 9, wherein at least one trustlet determines one of the plurality of trust levels based in part on a state associated with the trustlet.

14. The computer-implemented method of claim 10, wherein the trust aggregator determines the aggregated trust outcome based in part on a state of the trust aggregator.

15. The computer-implemented method of claim 10, wherein the trust aggregator determines the aggregated trust outcome based in part on configuration settings for the trust aggregator.

16. The computer-implemented method of claim 8, further comprising enabling at least one security measure of a mobile computing device when the first aggregated trust outcome is below a threshold.

17. The computer-implemented method of claim 8, further comprising disabling at least on security measure of a mobile computing device when the first aggregated trust outcome is above a threshold.

18. A computer-implemented system for aggregation of asynchronous trust outcomes comprising:
a storage comprising configuration settings;
one or more sensors, wherein at least one of the one or more sensors is a hardware sensor, each sensor adapted to generate at least one signal;
at least two trustlets, each of the at least two trustlets adapted to receive at least one signal from the one or more sensors and determine a trust level, a first of the at least two trustlets adapted to determine a first trust level from at least one signal from the one or more sensors including at least one signal from a hardware sensor independently of a determination of a trust level by a second of the at least two trustlets and without using the trust level determined by the second of the at least two trustlets, and the second of the at least two trustlets adapted to determine a trust level from at least one signal from the one or more sensors including at least one signal from a hardware sensor independently of the determination of a trust level by the first of the at least two trustlets and without using the trust level determined by the first of the at least two trustlets; and
a first trust aggregator adapted to aggregate the trust levels, determine a first aggregated trust outcome, wherein the first aggregated trust outcome is a granular aggregated trust outcome associated with a first security measure of a mobile computing device, and send the first aggregated trust outcome to be implemented by enabling or disabling the first security measure based on the first granular aggregated trust outcome, wherein the first security measure is not associated with the second granular aggregated trust outcome and the second granular aggregated trust outcome is not used to enable or disable the first security measure; and
a second trust aggregator adapted to aggregate the trust levels, determine a second aggregated trust outcome, wherein the second aggregated trust outcome is a granular aggregated trust outcome associated with a second security measure of a mobile computing device, wherein the first aggregated trust outcome is determined independent of the second aggregated trust outcome and without using the second aggregated trust outcome, wherein the second aggregated trust outcome is determined independent of the first aggregated trust outcome and without using the first aggregated trust outcome, and send the second aggregated trust outcome to be implemented by enabling or disabling the second security measure based on the second granular aggregated trust outcome, wherein the second security measure is not associated with the first granular aggregated trust outcome and the first granular aggregated trust outcome is not used to enable or disable the second security measure.

19. The computer-implemented system of claim 18, further comprising a trust consumer adapted to receive the first aggregated trust outcome and disable, enable, or relax at least one security measure based on the first aggregated trust outcome.

20. The computer-implemented system of claim 18, wherein at least one of the trustlets is further adapted to determine a trust level using one or more of heuristics, mathematical optimization, decisions trees, machine learning systems, and artificial intelligence systems.

21. The computer-implemented system of claim 18, wherein the first trust aggregator is further adapted to aggregate the trust levels and determine the first aggregated trust outcome using one or more of heuristics, mathematical optimization, decisions trees, machine learning systems, and artificial intelligence systems.

22. The computer-implemented system of claim 18, wherein the first aggregated trust outcome indicates a level of confidence that a mobile computing device is being used by an authorized user.

23. A system comprising: one or more computers and one or more storage devices storing instructions which are operable, when executed by the one or more computers, to cause the one or more computers to perform operations comprising:
  receiving one or more signals from one or more sensors, the one or more sensors comprising at least one hardware sensor;
  determining at least two trust levels from the one or more signals, wherein a first trust level of the at least two trust levels is determined independent of a determination of a second trust level and without using the second trust level, and wherein the second trust level of the at least two trust levels, and wherein each trust level is determined independent of the determination of the first trust level and without using the first trust level;
  determining a first aggregated trust outcome by aggregating the at least two trust levels, wherein the first aggregated trust outcome is a granular aggregated trust outcome associated with a first security measure of a computing device;
  determining a second aggregated trust outcome by aggregating the at least two trust levels, wherein the second aggregated trust outcome is a granular aggregated trust outcome associated with a second security measure different from the first security measure of the computing device;
  wherein the first aggregated trust outcome is determined independent of the second aggregated trust outcome and without using the second aggregated trust outcome;
  wherein the second aggregated trust outcome is determined independent of the first aggregated trust outcome and without using the first aggregated trust outcome;
  enabling or disabling the first security measure based on the first granular aggregated trust outcome, wherein the first security measure is not associated with the second granular aggregated trust outcome and the second granular aggregated trust outcome is not used to enable or disable the first security measure; and
  enabling or disabling the second security measure based on the second granular aggregated trust outcome, wherein the second security measure is not associated with the first granular aggregated trust outcome and the first granular aggregated trust outcome is not used to enable or disable the second security measure.

* * * * *